(12) United States Patent
Smith et al.

(10) Patent No.: US 6,337,849 B1
(45) Date of Patent: Jan. 8, 2002

(54) SERVICE MULTIPLEXER

(75) Inventors: Avril Joy Smith, Oxford; John Leonard Adams, Felixstowe, both of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/051,121
(22) PCT Filed: Jan. 8, 1997
(86) PCT No.: PCT/GB97/00038
§ 371 Date: Apr. 1, 1998
§ 102(e) Date: Apr. 1, 1998
(87) PCT Pub. No.: WO97/25830
PCT Pub. Date: Jul. 17, 1997

(30) Foreign Application Priority Data

Jan. 9, 1996 (EP) .............................................. 96300199

(51) Int. Cl.[7] .............................................. H04Q 11/04
(52) U.S. Cl. ........................ 370/230; 370/468; 370/538
(58) Field of Search ................................. 370/229, 230, 370/231, 332, 233, 235, 252, 395, 433, 468, 537, 540, 236, 249, 538

(56) References Cited

U.S. PATENT DOCUMENTS

| 5,179,556 A | 1/1993 | Turner |
| 5,231,631 A | 7/1993 | Buhrke et al. |

(List continued on next page.)

FOREIGN PATENT DOCUMENTS

| EP | A 0413488 | 2/1991 |
| EP | 9487235 | 5/1991 |
| EP | 0448073 | 9/1991 |
| EP | 0452223 A2 | 10/1991 |
| EP | 0468802 | 1/1992 |
| EP | 0522391 | 1/1993 |
| EP | A 0535860 | 4/1993 |
| EP | A 0603099 | 6/1994 |

OTHER PUBLICATIONS

Smith et al., Available Bit Rate–a new service for ATM, Elsevier, pp. 635–640, 1996.*

A. Romanov and S. Floyd, 'The Dynamics Of TCP Traffic Over ATM Networks', Proc. Sigcomm 94, UCL London, Aug. 1994, pp. 79–98.

(List continued on next page.)

Primary Examiner—Wellington Chin
Assistant Examiner—Frank Duong
(74) Attorney, Agent, or Firm—Nixon & Vanderhye P.C.

(57) ABSTRACT

A service multiplexer (2) for connecting a plurality of signal sources to a public switched communication network transfers data in the form of a synchronously transferred data cells from a plurality of inputs (4) to an output (6) for connection to the network. The multiplexer (2) includes a bandwidth control unit which receives a bandwidth control signal from the network representative of available bandwidth for transmission of cells to the network and generates feedback control signals for transmission to the signal sources to cause them to alter their data transmission rates in accordance with the available bandwidth. An activity detector coupled to the bandwidth control unit monitors the bandwidth of data received at the inputs. The multiplexer allows ABR (available bit rate)—commandable signal sources to be linked to a single port of a public network operating on an ABR basis to provide an efficient and fair allocation of bandwidth for each source.

10 Claims, 2 Drawing Sheets

U.S. PATENT DOCUMENTS

| | | | |
|---|---|---|---|
| 5,258,979 A | | 11/1993 | Oomuro et al. |
| 5,271,005 A | | 12/1993 | Takase et al. |
| 5,280,470 A | | 1/1994 | Buhrke et al. |
| 5,289,462 A | | 2/1994 | Ahmadi et al. |
| 5,291,481 A | | 3/1994 | Doshi et al. |
| 5,313,454 A | | 5/1994 | Bustini et al. |
| 5,315,586 A | | 5/1994 | Charvillat |
| 5,367,517 A | | 11/1994 | Cidon et al. |
| 5,377,327 A | | 12/1994 | Jain et al. |
| 5,448,559 A | * | 9/1995 | Hayter et al. ............... 370/346 |
| 5,463,620 A | * | 10/1995 | Sriram ...................... 370/236 |
| 5,497,375 A | * | 3/1996 | Hluchyj et al. ............. 370/395 |
| 5,528,592 A | | 6/1996 | Schibler et al. |
| 5,570,355 A | | 10/1996 | Dail et al. |
| 5,570,360 A | | 10/1996 | Klausmeier et al. |
| 5,577,035 A | | 11/1996 | Hayter et al. |
| 5,604,742 A | | 2/1997 | Colmant et al. |
| 5,633,859 A | * | 5/1997 | Jain et al. ................... 370/230 |
| 5,633,861 A | | 5/1997 | Hanson et al. |
| 5,636,212 A | | 6/1997 | Ikeda |
| 5,677,906 A | | 10/1997 | Hayter et al. |
| 5,696,764 A | | 12/1997 | Soumiya et al. |
| 5,898,670 A | * | 4/1999 | Hoebeke et al. ............ 370/236 |
| 5,940,370 A | | 8/1999 | Curtis et al. |
| 5,982,771 A | | 11/1999 | Caldara et al. |
| 6,011,804 A | | 1/2000 | Bertin et al. |

OTHER PUBLICATIONS

IEEE INFOCOM '93 The Conference on Computer Communications, vol. 3, Mar. 28, 1993, San Francisco, US, pp. 1288–1297, Bolla et al; "An integrated dynamic resource allocatgion for ATM networks".

Supercomm/ICC'94, vol. 3, May 1, 1994, New Orleans, US, pp. 1605–1615, Atai et al, "A Rate–Based Feedback Traffic Controller for ATM Networks".

IEEE Infocom '93 The Conference on Computer Communications, vol. 3, Mar. 28, 1993, San Francisco, US, pp. 1330–1336, Bernabei et al, "Analysis of On–Off Source Shaping for ATM Multiplexing".

Computer Networks and ISDN Systems, vol. 26, No. 1, Sep. 1993, Amsterdam, NL, pp. 43–59, Shiram, "Methodologies for bandwith allocation, transmission scheduling, and congestoin avoidance in broadband ATM Networks".

SUPERCOMM/ICC'94, May 1, 1994, New Orleans, US, pp. 733–737, Yazid et al, "Fast Reservation protocol and Statistical Multiplexing a comparative study".

IEEE Global Telecommunictions '93, Nov. 29, 1993, Houston, US, pp. 719–723, Newman, "Backward Explicit Congestion Notification for ATM Local Area Networks".

Crocetti et al, IEEE INFOCOM '91, vol. 3, Apr. 7, 1991, Bal Harbor, pp. 1145–1150 "Bandwidth Advertising for MAN/ATM Connectionless internetting".

Saito et al, Transactions of the Institute of Electronics, Information and Communications Engineers, vol. E74, No. 4, Apr. 1991, Tokyo, pp. 761–771, "Traffic Control Technologies in ATM Networks".

Tranchier et al, International Switching Symposium, vol. 2, Oct. 1992, Yokohama, pp. 7–11, "Fast Bandwidth Allocation in ATM Networks".

Chao et al, International Switching Symposium, vol. 1, Oct. 25 & 30, 1991, Yokohama, pp. 1229–1233, "General Architecture for Link–Layer Congestion Control in ATM Networks".

Smith, "A Congestion Control Protocol for ATM Switches", PhD Thesis, Jun. 1994, ITU–T Recommendation 1.371: "Traffic and Congestion Control in B–ISDN", Mar. 1993.

Romanow et al., "Dynamics of TCP Traffic over ATM Networks", ATM Flow Control, Ian Akyildiz, Georgia Tech, pp. 79–88.

Bolla et al., "An Integrated Dynamic Resource Allocation Scheme for ATM Networks", IEEE Infocom '93, The Conference on Computer Communications, Proceedings, vol. 3, Mar., 1993, pp. 1288–1297.

Atai, "A Rate–Based Feedback Traffic Controller for ATM Networks," Bell Communications Research, IEEE, 1994, pp. 1605–1615.

Bernabei, "Analysis of On–Off Source Shaping for ATM Multiplexing," Infocom Department, IEEE, 1993, pp. 1330–1336.

Sriram, "Methodologies For Bandwidth Allocation, Transmission Scheduling, And Congetion Avoidance In Broadband ATM Networks", 8213 Computer Networks Sep. 26, (1993), No. 1, Amsterdam, NL.

Yazid, "Fast Reservation Protocol and Statistical Multiplexing: a Comparative Study", IEEE, 1994, pp. 733–737.

Newman, "Backward Explicit Congestion Notification for ATM Local Area Networks," N.E.T. Adaptive Division, Redwood City, CA, Nov. 29, 1993, 5 pages.

Chapter 2, "Congestion Control in the B–ISDN", pp. 7–284.

* cited by examiner

SERVICE MULTIPLEXER

BACKGROUND OF THE INVENTION

1. Field of the Invention

The present invention relates to a multiplexer and in particular to a service multiplexer for the multiplexing of data and other signals from a plurality of signal sources for feeding to a public switched communication network.

2. Related Art

A service multiplexer is typically located in a customer's premises and is used to deliver and receive various data services via a single line between the multiplexer and the public network. The signal sources may comprise a combination of voice, video and data services such as Ethernet connections.

The prior art multiplexer has typically been connected to the public network via a link having a fixed datacarrying capacity or bandwidth. Correspondingly the signal sources connected to the input of the multiplexer have been allocated a fixed share of that bandwidth.

With the advent of more sophisticated connections to the public network such as an available bit rate (ABR) connection in which the bandwidth of the connection to the public network is variable, it has become necessary to provide a more sophisticated service multiplexer which is able to accommodate changes in the bandwidth of the connection to the public network

SUMMARY OF THE INVENTION

According to a first aspect of the present invention there is provided a service multiplexer having a plurality of inputs for connection to a respective plurality of signal sources and an output for connection to a signal receiving system, the multiplexer being operable to transfer data from the inputs to the output for transmission into the signal receiving system as a synchronously transferred data cells, wherein the multiplexer includes bandwidth control means for receiving a bandwidth control signal from the signal receiving system representative of an available bandwidth for the transmission of the cells into the signal receiving system and activity detection means for monitoring the bandwidth of data received at at least one of the respective inputs, the bandwidth control means being operable automatically to adjust the bandwidth of data transferred to the output according to the available bandwidth and to the monitored bandwidth or bandwidths.

By monitoring the bandwidth of data received at at least one of the respective inputs, the service multiplexer is able to adjust the relative bandwidth allocated to each of the signal sources to make the most efficient use of the bandwidth available on the connection to the signal receiving system.

The bandwidth control means is preferably operable to adjust the rate of transmission of the data transferred by generating a feedback control signal for transmission to a signal source via a respective input. When directed to an appropriate signal source, such a feedback signal causes the respective signal source to alter its transmission data bandwidth. In this way the bandwidth control means is able to control the bandwidth of data entering the multiplexer to suit the bandwidth available in a signal receiving system operating on an ABR basis, i.e. which indicates available bit rates to signal sources.

For signal sources which are not capable of interpreting feedback control signals or as an alternative way to control the bandwidth of data which has been received at the inputs, the bandwidth control means may be operable to adjust the data of bandwidth transferred by discarding a portion of data received at a respective input.

Preferably, where the data received at an input is divided into a plurality of groups, any discarded portion of the data is chosen from a subset of the groups. Thus if the data being received at the input is, for example, constructed from a plurality of frames each constructed from a plurality of cells, the bandwidth control means may discard or delete cells only from a single frame or subset of frames thereby maintaining the data integrity of the remaining frames. In this way, the need for re-transmitting data is typically reduced since not all frames will have been affected by the cell deletion as would be the case when using a random, "unintelligent" cell deletion technique.

The multiplexer preferably includes a stored table for containing characteristic data about each signal source which includes an identification of which signal sources are operable to receive feedback control signals. In this way, the bandwidth control means can choose which technique to use to control the bandwidth of data being received at the inputs (and thereby to adjust the bandwidth of data transferred to the output) according to which control method or control methods may be used with a particular signal source.

Preferably the activity detection means is operable to recognise a new active signal source, for example, by recognising that data has started to be received from this new signal source and the bandwidth control means is preferably operable in this case, to change the distribution of bandwidth allocations amongst the signal sources by reallocating the bandwidth of at least one existing active signal source to permit the allocation of bandwidth to the new active signal source. Alternatively, assuming that the fill bandwidth allocated to the connection to the ABR-type receiving system is not being used, the bandwidth control means may simply allocate some spare bandwidth to the new active signal source.

The activity detection means may also be operable to recognise a signal source which has not transmitted data for a predetermined period of time and may therefore reasonably be considered to have stopped transmitting. In this case, the bandwidth control means is preferably operable to de-allocate the bandwidth allocated to such a quiet signal source and if necessary to reallocate the de-allocated bandwidth to other signal sources.

The activity detection means is preferably operable to recognise a signal source which is transmitting data at a bandwidth less than a predetermined proportion of the bandwidth allocated to that signal source for longer than a predetermined time period and in this case the bandwidth control means is preferably operable to reduce the bandwidth allocation of such a recognised signal source. Thus a signal source which has been allocated more bandwidth than it needs to use can automatically have the unused portion of bandwidth reallocated by the bandwidth control means to more needy signal sources.

The activity detection means may be operable to recognise a signal source which is transmitting at more than a predetermined proportion of its allocated bandwidth for longer than a predetermined time period in which case the bandwidth control means may be operable to allocate more bandwidth to such a recognised signal source. In this way, if the activity detection means recognises that a signal source is likely to be able to use a larger bandwidth, the bandwidth control means may allocate more bandwidth to that signal source which may, for example, be spare bandwidth which is not being used or which may result from a reallocation of bandwidth to other signal sources.

Preferably, the multiplexer is arranged to provide separate data paths for the transfer of data, for signal sources which respectively are operable to receive feedback control signals and are not operable to receive feedback control signals. Since those signal sources which are not operable to receive feedback control signals are likely to be subject to cell deletion or deletion of portions of data received at the input in some other way, it is preferable to separate within the multiplexer the data paths of those signal sources which will have data deleted from the data paths of those which will not. In this way, those signal sources which are operable to receive feedback control signals and which can be commanded by the multiplexer to reduce their transmission bandwidth are not affected by cell or data deletion in addition to receiving reduced bandwidth feedback control signals.

According to a second aspect of this invention, there is provided a method of operating a service multiplexer having a plurality of inputs for connection to a respective plurality of signal sources and an output for connection to an ABR-type signal receiving system, the method comprising transferring data from the inputs to the output for transmission into the signal receiving system as a synchronously transferred data cells, receiving a bandwidth control signal from the signal receiving system representative of an available bandwidth for the transmission of the cells into the signal receiving system, monitoring the bandwidth of data received at at least one of the respective inputs, and automatically adjusting the bandwidth of data transferred to the output according to the available bandwidth and the monitored bandwidth or bandwidths, the method further comprising generating a feedback control signal to at least one of the signal sources to cause the said signal source to alter its transmission data bandwidth.

It will be understood, at least in the context of this patent application, that a signal source may be a single physical source or may be one of a plurality of virtual channels (which may themselves be grouped into one or more virtual paths) sourced from one or more physical sources. The terms "signal sources" and "inputs" should therefore be construed accordingly.

The invention will now be described by way of example with reference to the drawings in which:

DETAILED DESCRIPTION OF EXEMPLARY EMBODIMENTS

Figure 1:
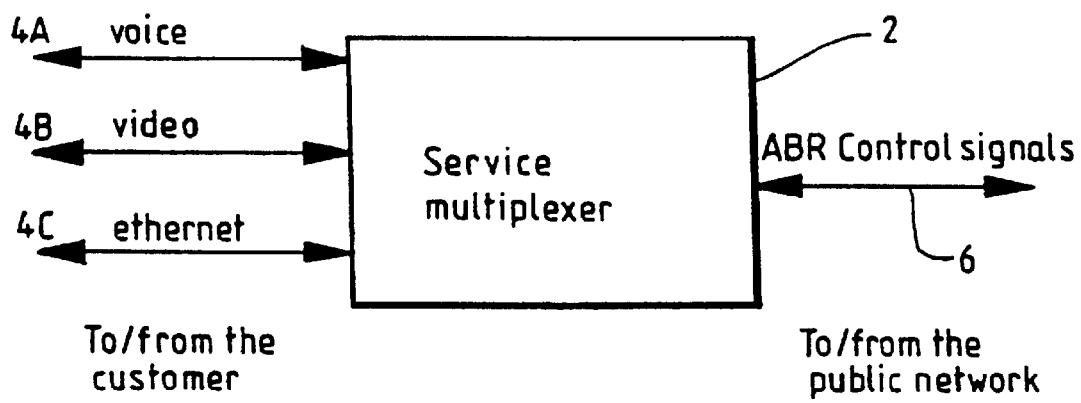
FIG. 1 is a block diagram of a service multiplexer in accordance with the invention and connected between a public network and several customer signal sources.

With reference to FIG. 1, a service multiplexer 2 is used to connect a plurality of customer communication services 4A, 4B, 4C which may, for example, be voice, video and local area network (e.g. Ethernet) services, to a single connection 6 to a public network. It will be appreciated that several such service multiplexers 2 may be used in combination to permit connection of a plurality of customer communication services to a plurality of ports of the public network. Normally, the service multiplexer is connectable on the user side of a user/network interface.

In practice, the service multiplexer 2 typically has a plurality of inputs capable of handling data from sources with externally commandable output data rates as well as a plurality of inputs for handling data from non-commandable sources.

Figure 2:
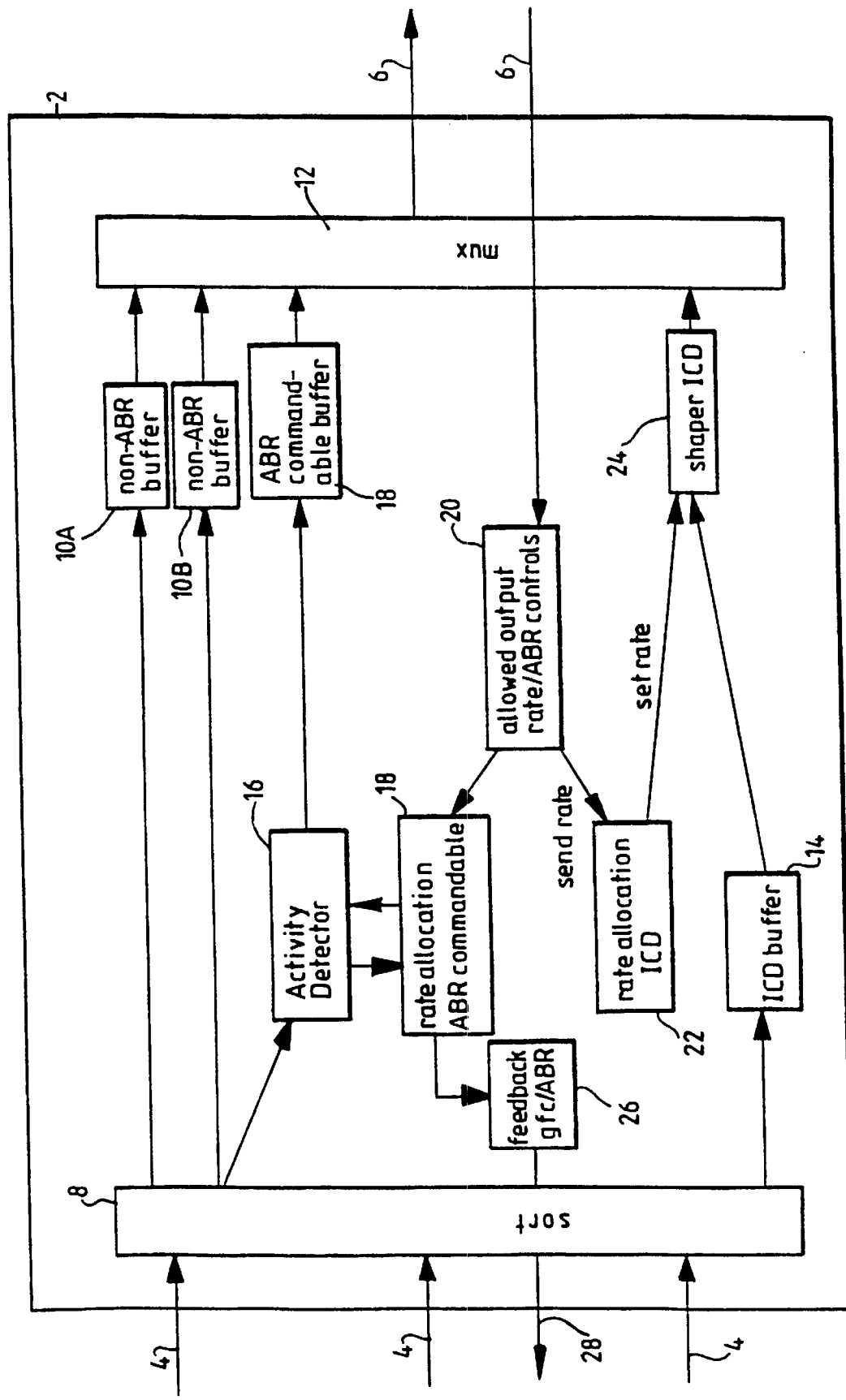
FIG. 2 is a more detailed block diagram of the service multiplexer of FIG. 1.

With reference now to FIG. 2, the multiplexer is arranged to received three different classes of data which, upon entry into the multiplexer, are first sorted by a sorter 8.

The three possible classes of data sorted by the sorter 8 are (i) non-ABR data, for example, for CBR (constant bit rate) or VBR (variable bit rate), (ii) ABR traffic from a signal source which is non-commandable in the sense that it cannot be commanded by feedback control signals to alter its transmission bandwidth, and (iii) ABR traffic which is commandable.

The multiplexer receives a further input of information from the public network connection 6. This information includes ABR control signals which indicate the rate at which data may be transmitted onto the public network and therefore indicates the available bandwidth. This is described more fully below.

Non-ABR data received by the service multiplexer is sorted in the sorter 8 and directed to non-ABR buffers 10A, 10B for onward transmission onto the public network via a multiplexer 12. The service multiplexer 2 may include more or fewer of these buffers depending on which and how many different types of non-ABR traffic are permitted to be connected to the inputs 4.

ABR traffic which is non-commandable is sorted by the sorter 8 and directed to an intelligent cell discard (ICD) buffer 14.

The remaining class of data, namely ABR commandable traffic, is directed via an activity detector 16 to a buffer 18 for ABR commandable data for onward transmission via the multiplexer 12.

The activity detector 16 operates to monitor the bandwidth of incoming traffic from ABR commandable sources. The monitoring is performed primarily to supply information to a rate allocator 18 for ABR commandable traffic. Typically the information supplied to the rate allocator 18 breaks down into whether each signal source or virtual channel (VC) has gone quiet and is no longer transmitting and therefore should have its bandwidth allocation removed, whether the allocation is being fully used or only partially used in which case the allocation may need to be increased or decreased respectively, or whether the allocation is being used sufficiently to merit the VC maintaining its current allocation of bandwidth and yet is not being used so much that more bandwidth should be allocated to that VC. Thus, typically the activity detector will issue one of three indications in connection with each VC, namely bandwidth needs to be de-allocated, bandwidth allocation needs to be checked, or bandwidth allocation does not need to be changed.

The activity detector may also be used for other purposes such as monitoring the volume of ABR commandable data passing through the multiplexer for providing an indication of likely charges to a customer or even actually to perform a charging calculation for the public network provider. Furthermore, although an ABR signal source should transmit accurately within its allocated bandwidth, if such a signal source becomes faulty, this may be detected by the activity detector and appropriate action taken, such as causing a new feedback control signal to be issued or causing cells to be deleted from the stream coming from that signal source.

The rate allocator 18 for ABR commandable data operates to ensure that each VC receives a fair share of the available bandwidth on the connection to the public network. As discussed above, an available bandwidth for ABR traffic is sent from the public network and is received and decoded within the service multiplexer by an ABR controller 20. The controller 20 divides the available bandwidth for ABR traffic between the rate allocator 18 for ABR commandable traffic and a rate allocator 22 for non-commandable traffic which will be the subject of intelligent cell discard.

The rate allocators 18 and 22 each hold a table of allocated bandwidths or transmission rates for each active VC. Since in the case of the VCs for which rate allocator 22 holds rates, there is no possibility of changing the transmission rate of each VC, the only possibility is to discard cells when the transmission rate of the VC exceeds that held in the stored table. To achieve this, the rate allocator 22 instructs a shaper 24 to delete or transfer to the multiplexer 12 certain cells from particular VCs. By deleting a cell from a particular VC, the transmission rate of that VC is reduced.

In the case of the rate allocator 18 which holds allocated transmission rates for signal sources which can be commanded to adjust their transmission rate, a more sophisticated technique is used. As described above, in conjunction with the activity detector 16, the rate allocator 18 is able to assess which VCs require more bandwidth, less bandwidth, no bandwidth or the same as their current bandwidth. In conjunction with a feedback controller 26 the transmission rate of any particular signal source or VC may be adjusted by transmitting a feedback control signal. Two typical techniques for doing this are to use generic flow-control (GFC) or ABR control signals. These are typically sent back to a signal source or VC by inserting a resource management (RM) cell in the cell stream flowing back from the service multiplexer to a signal source on a respective feedback line 28 which may be one of several such lines associated with inputs 4 capable of receiving signals from rate-commandable signal sources. If the rate allocator 18 causes a change in a bandwidth allocation of a particular VC, this change is communicated to the activity detector 16 so that the activity detector 16 can update its own stored table of transmission rates for each VC to ensure that it is accurately able to judge whether a VC should have more, less or no bandwidth allocated to it.

The shaper 24 for non-commandable ABR traffic maintains a table of VCs which includes information about which VCs are to have cells deleted from their respective cell streams. Furthermore, the feedback module 26 maintains a record of which type of feedback control signal is applicable to which signal source.

Thus, the service multiplexer described above is capable of multiplexing several different types of traffic and of adjusting the bandwidths of the traffic in the most appropriate manner in order to transmit the data into a public network via an ABR-type connection, i.e. a connection in which transmission rate control signals are passed between the network and a signal source.

What is claimed is:

1. A service multiplexer connectible on the user side of an interface between communications equipment of an user and a public telecommunications network, the multiplexer having a plurality of inputs for connection to a respective plurality of signal sources associated with the user and an output for connection to a line connecting the user equipment to the public network, the multiplexer being operable to transfer data from the inputs to the output for transmission into the public network as asynchronously transferred data cells, wherein the multiplexer includes bandwidth control means for receiving a bandwidth control signal from the public network representative of an available bandwidth for the transmission of the cells into the public network and activity detection means for monitoring the bandwidth of data received at at least one of the respective inputs, the bandwidth control means being operable automatically to adjust the bandwidth of data transferred to the output according to the available bandwidth and to the monitored bandwidth or bandwidths, and wherein the bandwidth control means is operable to adjust the bandwidth of the data transferred by generating a feedback control signal for transmission to a signal source via a respective input, which feedback control signal causes the respective signal source to alter its transmission data bandwidth.

2. A multiplexer according to claim 1, wherein the bandwidth control means is operable to adjust the bandwidth of data transferred by discarding a portion of data received at a respective input.

3. A multiplexer according to claim 2, wherein the data received at an input is divided into a plurality of groups and wherein each discarded portion is chosen from a subset of the groups.

4. A multiplexer according to claim 1, including a stored table for containing characteristic data about each signal source which includes an identification of which signal sources are operable to receive feedback control signals.

5. A multiplexer according to claim 1, wherein the activity detection means is operable to recognise a new active signal source and wherein the bandwidth control means is operable to reallocate the bandwidth of at least one existing active signal source to permit the allocation of bandwidth to the new active signal source.

6. A multiplexer according to claim 1, wherein the activity detection means is operable to recognise a quiet signal source which has not transmitted data for a predetermined period of time and wherein the bandwidth control means is operable to de-allocate the bandwidth allocated to the quiet signal source and to reallocate the de-allocated bandwidth to other signal sources.

7. A multiplexer according to claim 1, wherein the activity detection means is operable to recognise a signal source which is transmitting data at a bandwidth less than a predetermined proportion of the bandwidth allocated to that signal source for longer than a predetermined time period and wherein the bandwidth control means is operable to reduce the bandwidth allocation of such a recognised signal source.

8. A multiplexer according to claim 1, wherein the activity detection means is operable to recognise a signal source which is transmitting at more than a predetermined proportion of its allocated bandwidth for longer than a predetermined time period and wherein the bandwidth control means is operable to allocate more bandwidth to such a recognised signal source.

9. A multiplexer according to claim 1, wherein the multiplexer is arranged to provide separate data paths for the said transfer of data for signal sources which respectively are operable to receive feedback control signals and are not operable to receive feedback control signals.

10. A method of operating a service multiplexer connected on the user side of an interface between communications equipment of an user and an ABR-type public telecommunciations network, the multiplexer having a plurality of inputs for connection to a respective plurality of signal sources associated with user and an output for connection to a line connecting the user equipment to the public network, the method comprising transferring data from the inputs to the outputs for transmission into the public network as asynchronously transferred data cells, receiving a bandwidth control signal from the public network representative of an available bandwidth for the transmission of the cells into the public network, monitoring the bandwidth of data received at at least one of the respective inputs, and automatically adjusting the bandwidth of data transferred to the output according to the available bandwidth and the monitored bandwidth or bandwidths, the method further comprising generating a feedback control signal to at least one of the signal sources to cause the said signal source to alter its transmission data bandwidth.

\* \* \* \* \*